(12) United States Patent
Bayramoglu

(10) Patent No.: US 8,981,242 B2
(45) Date of Patent: Mar. 17, 2015

(54) INDUCTIVE TOUCH SENSOR AND DETECTING METHOD

(75) Inventor: Gokalp Bayramoglu, Xiamen (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 244 days.

(21) Appl. No.: 12/880,159

(22) Filed: Sep. 13, 2010

(65) Prior Publication Data

US 2011/0285454 A1    Nov. 24, 2011

(30) Foreign Application Priority Data

May 23, 2010 (CN) .......................... 2010 1 0187689

(51) Int. Cl.
 *G06F 3/046* (2006.01)
(52) U.S. Cl.
 CPC ..................... *G06F 3/046* (2013.01)
 USPC ....................................... 178/18.07; 345/173
(58) Field of Classification Search
 USPC .......... 345/173–179; 178/18.01–18.08, 19.03
 See application file for complete search history.

(56) References Cited

U.S. PATENT DOCUMENTS

| | | | |
|---|---|---|---|
| 6,762,752 B2 | 7/2004 | Perski et al. | |
| 2003/0098858 A1 | 5/2003 | Perski et al. | |
| 2007/0046651 A1* | 3/2007 | Sinclair et al. | 345/173 |
| 2008/0150914 A1* | 6/2008 | Yamamoto | 345/175 |
| 2009/0160789 A1 | 6/2009 | Kreit | |
| 2010/0103112 A1* | 4/2010 | Yoo et al. | 345/169 |
| 2010/0328249 A1* | 12/2010 | Ningrat et al. | 345/174 |
| 2011/0032193 A1* | 2/2011 | Szalkowski | 345/173 |

FOREIGN PATENT DOCUMENTS

| | | |
|---|---|---|
| JP | 4152958 | 5/1992 |
| JP | 05298007 | 11/1993 |
| JP | 2005004274 | 1/2005 |
| JP | 2005510814 | 4/2005 |
| JP | 2007218892 | 8/2007 |
| JP | 2012502397 | 1/2012 |
| TW | 2010010010 A | 3/2010 |
| WO | 2010030710 | 3/2010 |

* cited by examiner

*Primary Examiner* — Premal Patel
(74) *Attorney, Agent, or Firm* — Gokalp Bayramoglu

(57) ABSTRACT

An inductive touch sensor is provided. The inductive touch sensor comprises a driving layer for generating a magnetic field, an induced layer facing to the driving layer for identifying at least one induced electrical signal representing a change, in inductance corresponding to at least one touch location on the inductive touch sensor and at least one inductive circuit connected to the driving layer and the induced layer for detecting at least one induced electrical signal to determine at least one touch location on the inductive touch sensor. Furthermore, a detecting method of detecting at least one touch location on the inductive touch sensor is also provided.

32 Claims, 9 Drawing Sheets

INDUCTIVE TOUCH SENSOR AND DETECTING METHOD

This application claims the benefit of application of People's Republic of China No. 201010187689.5, filed on May 23, 2010.

FIELD OF THE INVENTION

The present invention relates to a touch sensor, and more specifically relates to a touch sensor using inductive sensing technology and its detecting method.

BACKGROUND OF THE INVENTION

During the last two decades, touch technologies have gained acceptance in a variety of consumer applications, such as touch screens in ATMs (automated-teller machines), track pads in laptop computers, and scroll wheels in media players. The movement of an object such as a finger or stylus along a surface of the touch sensor is detected by the touch sensor to generate electrical, signals for the subsequent process.

There are many types of touch sensing methods, such as resistive sensing type, capacitive sensing type, acoustic sensing type, optical sensing type, and the like, widely used in such technique field. For a resistive touch sensor, two continuous resistive sheets are stacked together with spacers at a predetermined interval clamped between the continuous resistive sheets. In operation, the two sheets contact each other at a touch location where an object touches a corresponding place of the outside surface of the touch sensor. The centroid of the touch location is detected by reading a current change at the touch location. However, if a multiple touch happens, then such resistive touch sensor can not distinguish multiple touch locations apart.

For the capacitive sensing type, there are two sub types, i.e. a projective capacitive type and a surface capacitive type. A projective capacitive touch sensor contains a lattice electrode pattern, while a surface capacitive touch sensor includes electrodes on the edge of a continuous conductive sheet. The capacitive touch sensor determines the touch locations by detecting the change in capacitance, when a conductive object such as a metal object or a finger approaches certain positions defined as the touch locations after being touched. However, the capacitive touch sensors are insensitive to dielectric materials.

An acoustic touch sensor comprises an element for emitting sound waves and another element for receiving sound waves, which causes the sound waves to be transmitted across the surface of the touch sensor. An object touching the surface absorbs some of the energy of the sound waves, which can be detected at the touch location. An optical touch sensor works in the similar way to the acoustic touch sensor, except that light waves such as infra-red waves but not sound waves are transmitted along the surface. However; both of these two types of touch sensors require frames to install the emitting elements and the receiving element. Moreover, the contaminants, such as dust, grease, etc, can also cause false activation on, the screen and the sensibility of the touch sensor is decreased.

SUMMARY OF THE INVENTION

It is an object of the present invention to provide an inductive touch sensor that can detect both the conductive and dielectric objects.

The inductive touch sensor comprises a driving layer for generating a magnetic field, an induced layer facing to the driving layer for identifying at least one induced electrical signal representing a change in inductance corresponding to at least one touch location on the inductive touch sensor and at least one inductive circuit connected to the driving layer and the induced layer for detecting at least one induced electrical signal to determine at least one touch location on the inductive touch sensor.

It is another object of the present invention to provide a detecting method of detecting a touch location on an inductive touch sensor.

The detecting method of detecting at least one touch location on an inductive touch sensor comprises steps of: a) applying a driving current to a driving layer to generate a magnetic field which induces an inductance on an induced layer; b) identifying at least one induced electrical signal representing at least one change in the inductance in the induced layer when at least one touch location occurs on the inductive touch sensor; c) transmitting at least one induced electrical signal to a controller; and d) determining at least one touch location by processing at least one induced electrical signal.

By means of the present invention, an inductance touch sensor can detect the presence of both conductive and dielectric objects to overcome the disadvantage of these touch sensors using other sensing methods mentioned above.

BRIEF DESCRIPTION OF THE DRAWINGS

Skilled persons in the art will understand that the drawings, described below, are for illustration purposes only and do not limit the scope of the present invention in any way. In the drawings, like reference numerals designate corresponding parts throughout the several views.

FIG. 2b is a schematic exploded plan view of the inductive touch sensor of FIG. 2a;

FIG. 7b is a schematic exploded plan view of FIG. 7a;

FIG. 9b is a schematic exploded plan view of FIG. 9a.

DETAILED DESCRIPTION OF THE EMBODIMENTS

Figure 1:
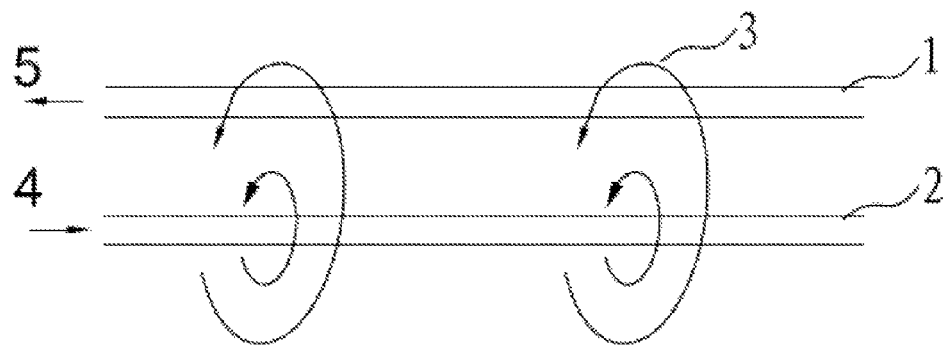
FIG. 1 is a schematic view of generating inductance between two wires.

As we know, any given conductor line generates flux lines if a current goes through it. The strength of the flux lines and the magnetic field generated by the conductor line is determined by the physical shape and the amount of current following through it. If there is another conductor line closed to the first conductor line then the flux generated by the first conductor line will induce inductance on the second conductor line. Referring to FIG. 1, this is a known physical characteristic of two current carrying wires. Current 4 is applied to wire 2. This current 4 causes wire 2 generate magnetic field 3 which surrounds wire 1. The magnetic field 3 induces inductance on wire 1. The amount of inductance will depend on the distance and other parameters between these two conductor lines. If the distance between these two conductor lines is changed then the inductance will change. An electrical signal 5 indicating the change in inductance is output. The electrical signal 5 may be voltage, current, etc. Thus, detecting the change in inductance can be used to determine the touch location that causes the distance change. The inductive touch sensor of the present invention is based on the above mentioned inductive sensing method.

Figure 2A:
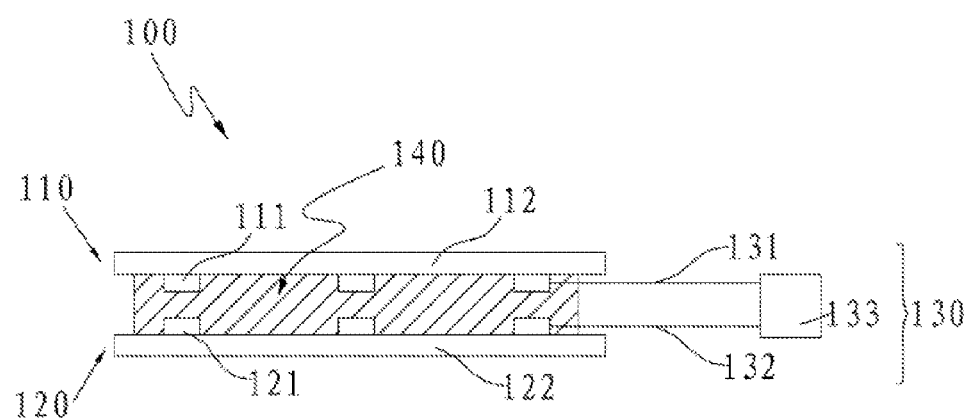
FIG. 2a is a schematic sectional view of an inductive touch sensor in accordance with the first embodiment of the present invention.
Figure 2B:
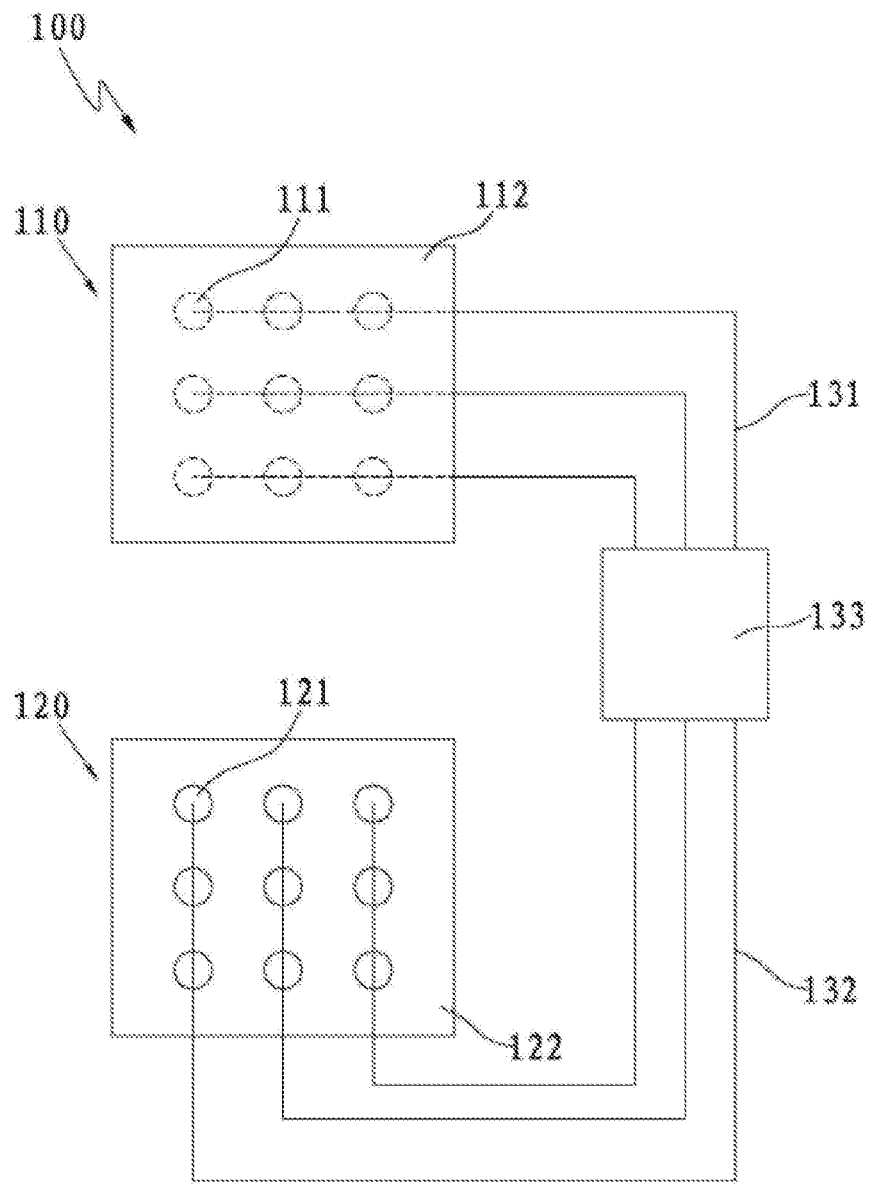

FIG. 2a and FIG. 2b show the inductive touch sensor 100 in accordance with first embodiment of the present invention. The inductive touch sensor 100 comprises a driving layer 110, an induced layer 120 and an inductive circuit 130. The driving layer 110 includes a plurality of driving electrodes 111 and the induced layer 120 includes a plurality of induced electrodes 121, wherein each driving electrodes 111 faces to a corresponding induced electrode 121. To keep the distance between the driving electrodes 111 and the induced electrodes 121 to prevent them from connecting with each other, they are spaced by insulating medium 140. The insulating medium 140 may be a continuous insulating layer or a plurality of spacer dots. Besides, the insulating medium 140 is deformable material, such as plastic, liquid gel, etc. The air is also introduced into the inductive touch sensor 100 as the insulating medium 140. For supporting the driving electrodes 111 and the induced electrodes 121, a driving substrate 112 and an induced substrate 122 are provided correspondingly. The inductive circuit 130 contains a plurality of driving conductor lines 131, a plurality of induced conductor lines 132, and a controller 133. The driving conductor lines 131 connect the driving electrodes 111 in a first direction on the driving substrate 112 to the controller 133, while the induced conductor lines 132 connect the induced electrodes 121 in a second direction on the induced substrate 122 to the controller 133.

In operation, the controller 133 applies a driving current to the driving electrodes 111 through the driving conductor lines 131, leading to creating magnetic field around the driving electrodes 111. The magnetic field acts on the induced electrodes 121 and inductance of the induced electrodes 121 occurs. The inductance is a function of the distance between the induced electrodes 121 and the driving electrodes 111. When the outer surface of driving substrate 112 where the driving electrodes 111 are placed is touched at a touch location, the driving substrate 121 is depressed and gets closer to the induced substrate 122 where the induced electrodes 121 are placed. The distance between the driving electrodes 111 and the induced electrodes 121 at the touch location is reduced. This change in distance causes a change in inductance induced in the induced electrodes 121 and represented by an electrical signal which is output to the controller 133 through the induced conductor lines 132 to find out the touch location.

Figure 3:
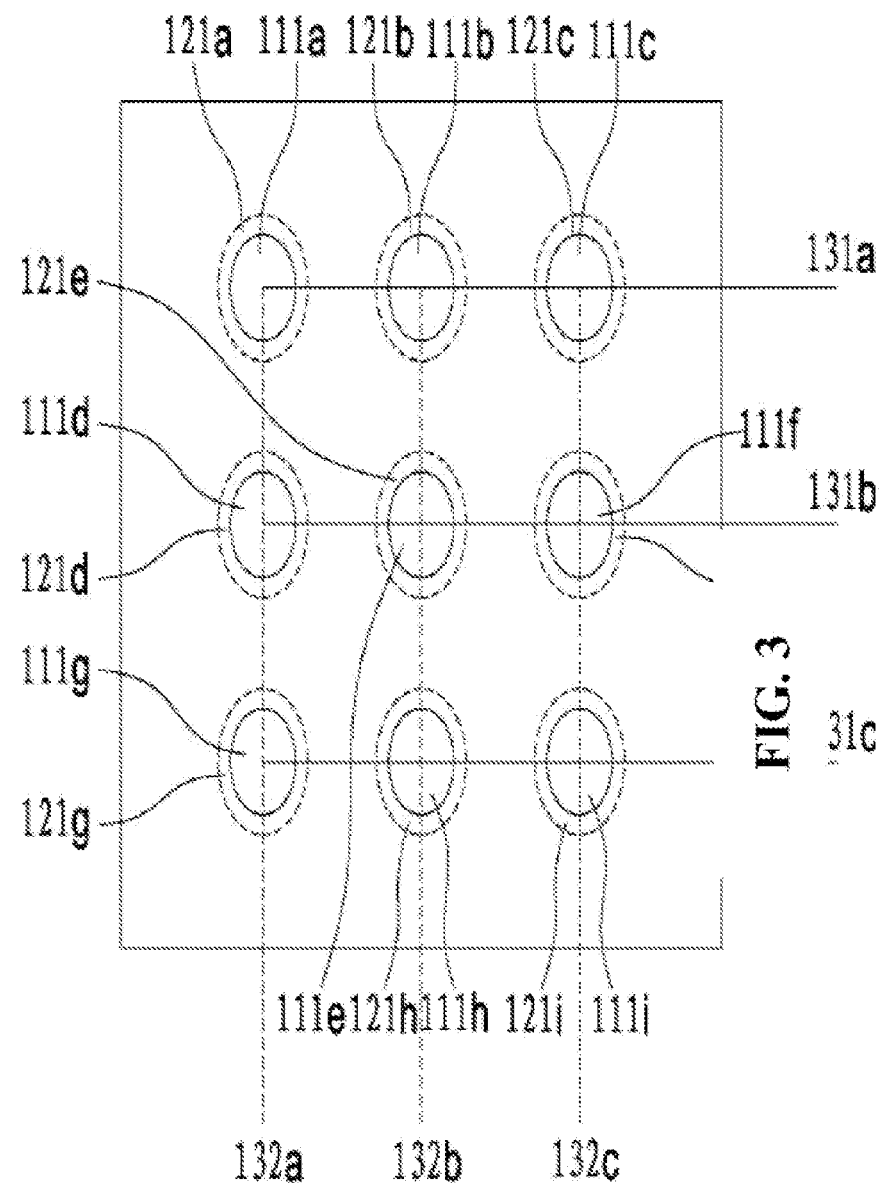
FIG. 3 is a schematic use diagram illustrating, the working principle of the inductive touch sensor of FIG. 2a and FIG. 2b.

Referring to FIG. 3, the driving electrodes 111a, 111b and 111c are located on the driving conductor line 131a, the driving electrodes 111d, 111e and 111f are located on the driving conductor line 131b, and the driving electrodes 111g, 111h and 111i are located on the driving conductor line 131c. Meanwhile, the induced electrodes 121a, 121d and 121g are located on the induced conductor line 132a, the induced electrodes 121b, 121e and 121h are located on the induced conductor line 132b, and the induced electrodes 121c, 121f and 121i are located on the induced conductor line 132c. The driving conductor lines 131a, 131b, and 131c are driven in turn. After each driving conductor line 131a, 131b, or 131c is driven by the driving current, the induced conductor lines 132a, 132b, and 132c are detected. For example, when the driving current passes through the driving conductor lines 131a, the driving electrodes 111a, 111b, and 111c generate magnetic fields which create inductances in the induced electrodes 121a, 121b, and 121c. If a location of the outer surface where just above the driving electrode 111a is touched, the driving electrode 111a gets closer to the induced electrode 121a. As the distance between the driving electrode 111a and the induced electrode 121a at the touch location decreases, the inductance in the induced electrode 121a increases and a corresponding induced electrical signal is generated. The induced electrical signal is detected when detecting the induced conductor line 132a. Thus, the touch location is determined by the controller 133 based on the induced conductor line 132a and the driving conductor line 131a.

Figure 4A:
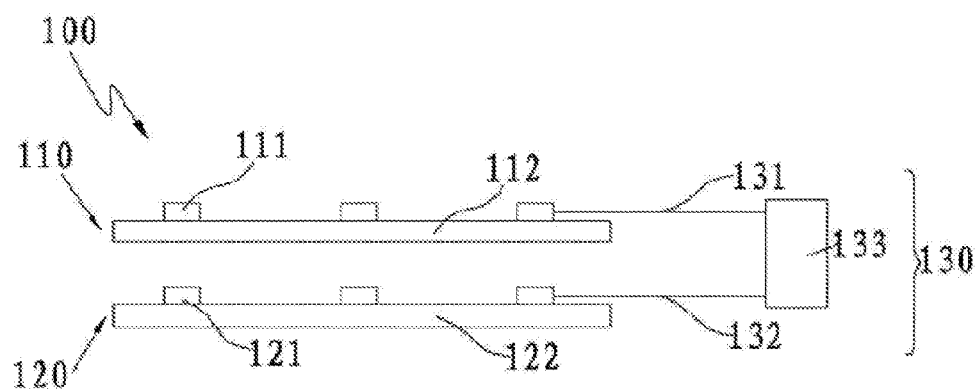
FIGS. 4a-4c are a schematic sectional views of the inductive touch sensor including other assemblies of the first embodiment.
Figure 4B:
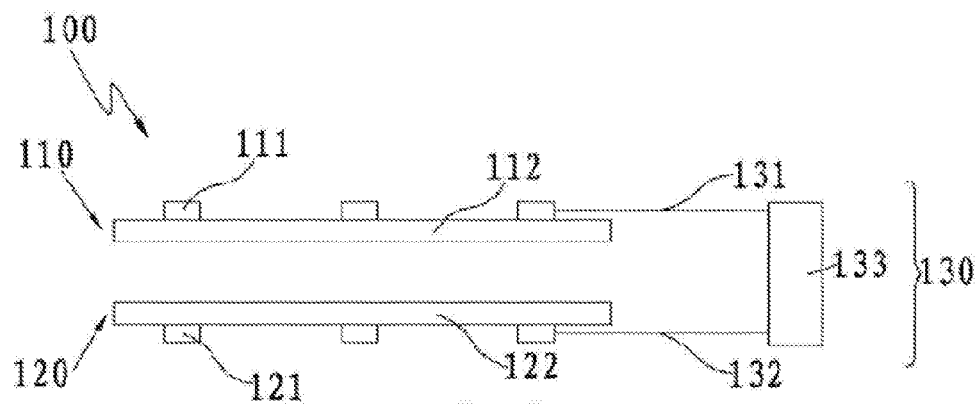
Figure 4C:
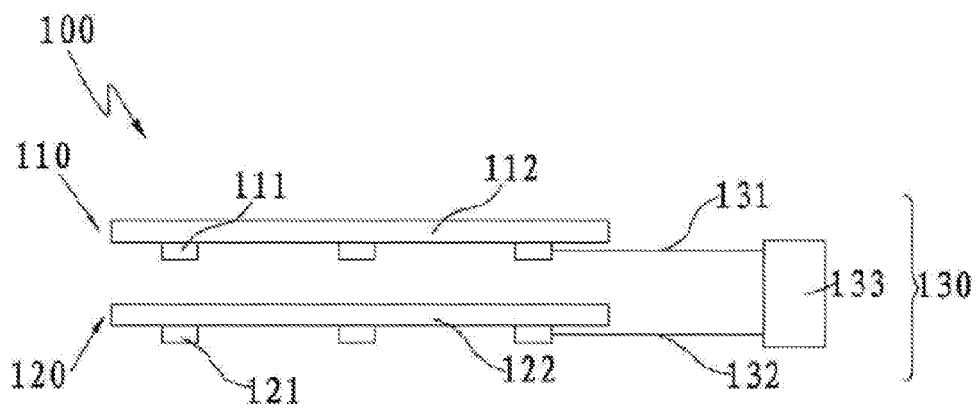

The driving electrodes 111 may be placed on either the outer surface or the inner surface of the driving substrate 112, while the induced electrodes 121 may be placed on either the outer surface or the inner surface of the induced substrate 122, as shown in FIGS. 4a-4c. Given the driving electrodes 111 located on the outer surface of the driving substrate 112 or the induced electrodes 121 located on the outer surface of the induced substrate 122, one or more protective means, e.g. cover sheets, (not shown) could be introduced to lay on the driving electrodes 111 or the induced electrodes 121 to protect them from being scratched.

Figure 5:
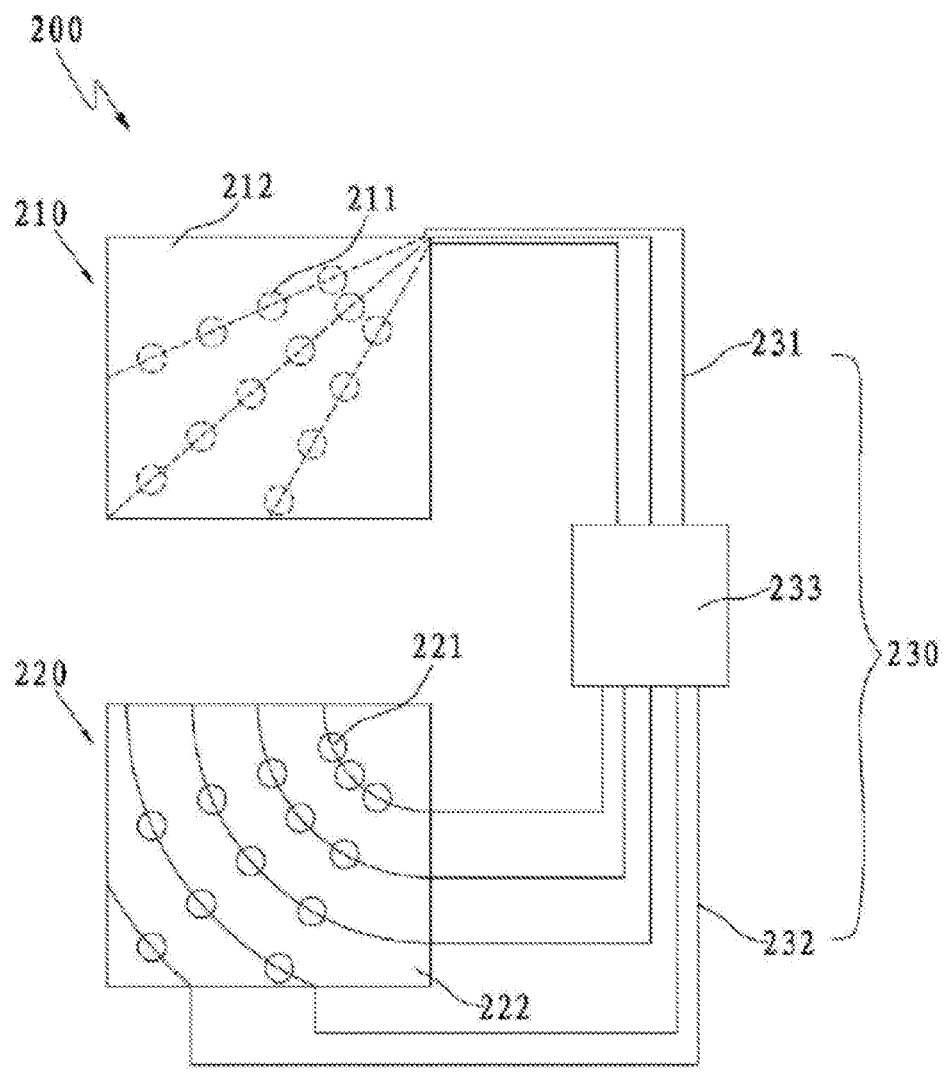
FIG. 5 is a schematic exploded plan view of an inductive touch sensor in accordance with the second embodiment of the present invention.

The driving conductor lines and the induced conductor lines are not limited to be the straight lines. FIG. 5 presents an inductive touch sensor 200 in accordance with the second embodiment of the present invention. The inductive touch sensor 200 comprises a driving layer 210, an induced layer 220, and an inductive circuit 230. The driving layer 210 comprises a plurality of driving electrodes 211 and a driving substrate 212 supporting the driving electrodes 211, while the induced layer 220 comprises a plurality of induced electrodes 221 and an induced substrate 222 supporting the induced electrodes 221. The inductive circuit 230 includes a plurality of driving conductor lines 231, a plurality of induced conductor lines 232, and a controller 233. Connecting the driving electrodes 211 to the controller 233, the driving conductor lines 231 run from a corner of the driving substrate 212 and extend along different directions to cover the inner surface of the driving substrate 212. Meanwhile, connecting the induced electrodes 221 to the controller 233, the induced conductor lines 232 distribute as a plurality of concentric arcs on the inner surface of the induced substrate 222. The method of detecting the touch location is the same as that of the first embodiment. According to the distribution of the driving conductor lines 231 and the induced conductor lines 232, the touch location is determined by the controller 233 based on the polar coordinates defined by the angles of the driving conductor lines 231 and the are radiuses of the induced conductor lines 232.

Figure 6:
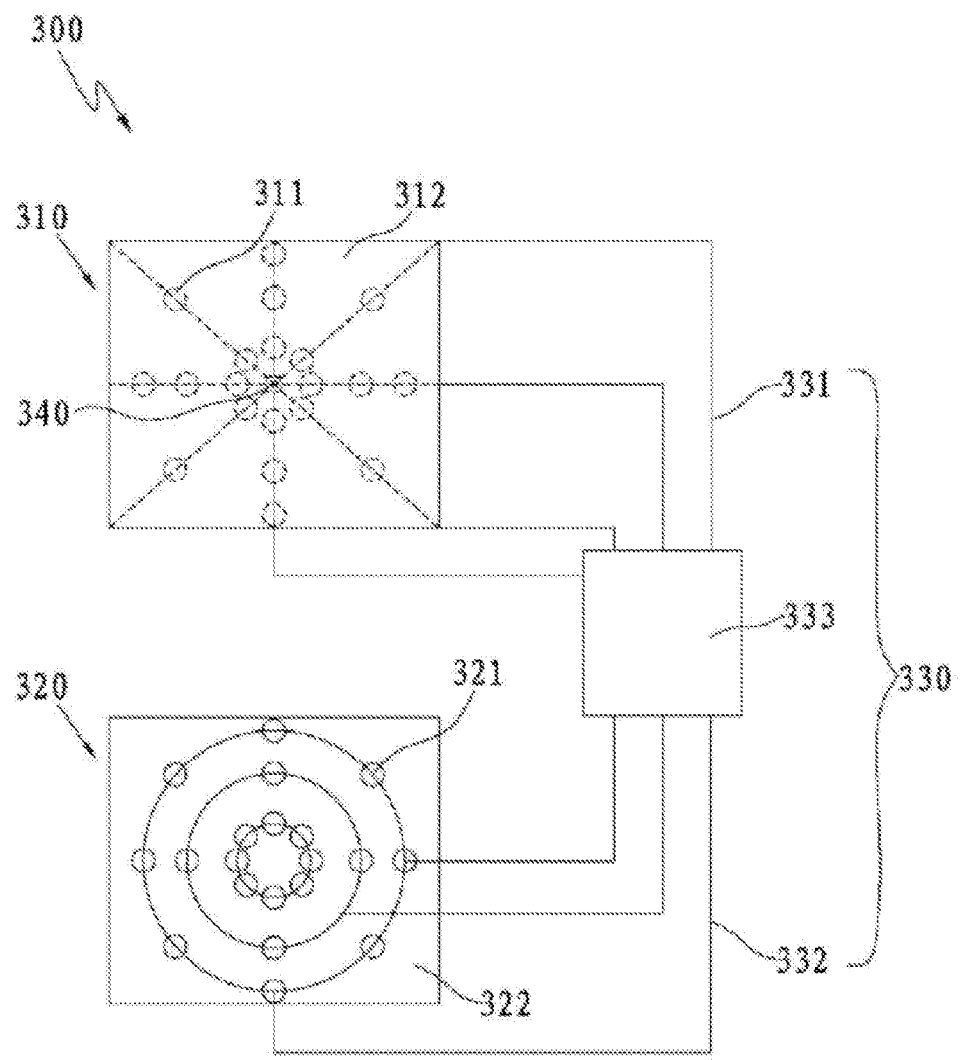
FIG. 6 is a schematic exploded plan view of an inductive touch sensor in accordance with, the third embodiment of the present invention.

The intersection of driving conductor lines in the second embodiment should not be limited to the corner but can also be any points on the inner surface of the driving substrate. For example, according to the third embodiment of the present invention based on the polar coordinates to determine the touch location similarly to the second embodiment, when the intersection of driving conductor lines 331 is the centre of the inner surface of the driving substrate 312, the inductive touch sensor 300 can be assembled in another way, as shown in FIG. 6. The inductive touch sensor 300 comprises a driving layer 310 having the driving substrate 312 and a plurality of driving electrodes 311, an induced layer 320 having an induced substrate 322 and a plurality of induced electrodes 321, and an inductive circuit 330. Different from the second embodiment, the driving conductor lines 331 of the inductive circuit 330 extend along different direction and intersect at the centre of the inner surface of the driving substrate 312. At the intersection of the driving conductor lines 331, a plurality of insulator pieces 340 is provided to insulate driving conductor lines 331 from each other. Meanwhile, as the intersection positioned in the centre, the induced conductor lines 332 of the inductive circuit 330 are a plurality of concentric circles whose centre is the centre of the inner surface of the induced substrate 322 instead of the concentric arcs in the second embodiment. The other connections are the same as that of the second embodiment.

In addition, the driving conductor lines can distribute as the concentric circles or concentric arcs, while the induced conductor lines can extend along different directions and intersect at any one point on the inner surface of the induced substrate.

For the first embodiment above, the driving electrodes connected in the first direction and the induced electrodes connected in the second direction are both used to determine the touch location. There is still another driving-detecting principle for the present invention, that is: given another plate electrode acting as the driving electrode to create the magnetic field, the induced electrodes can be divided into two groups to fix the touch location in two directions.

Figure 7A:
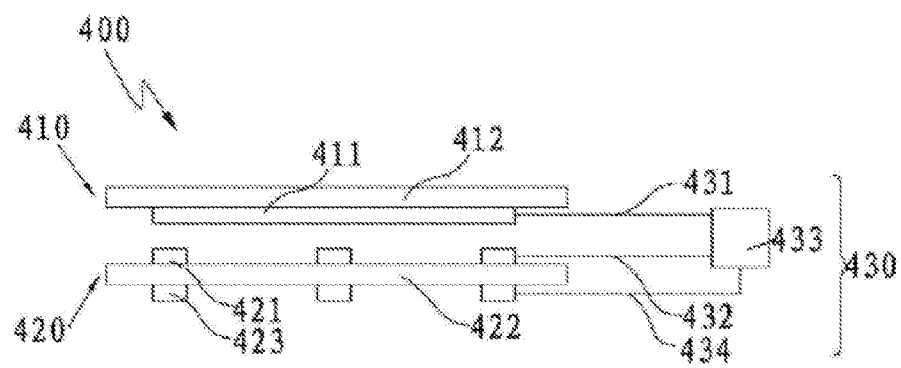
FIG. 7a is a schematic sectional view of an inductive touch sensor in accordance with the fourth embodiment of the present invention.
Figure 7B:
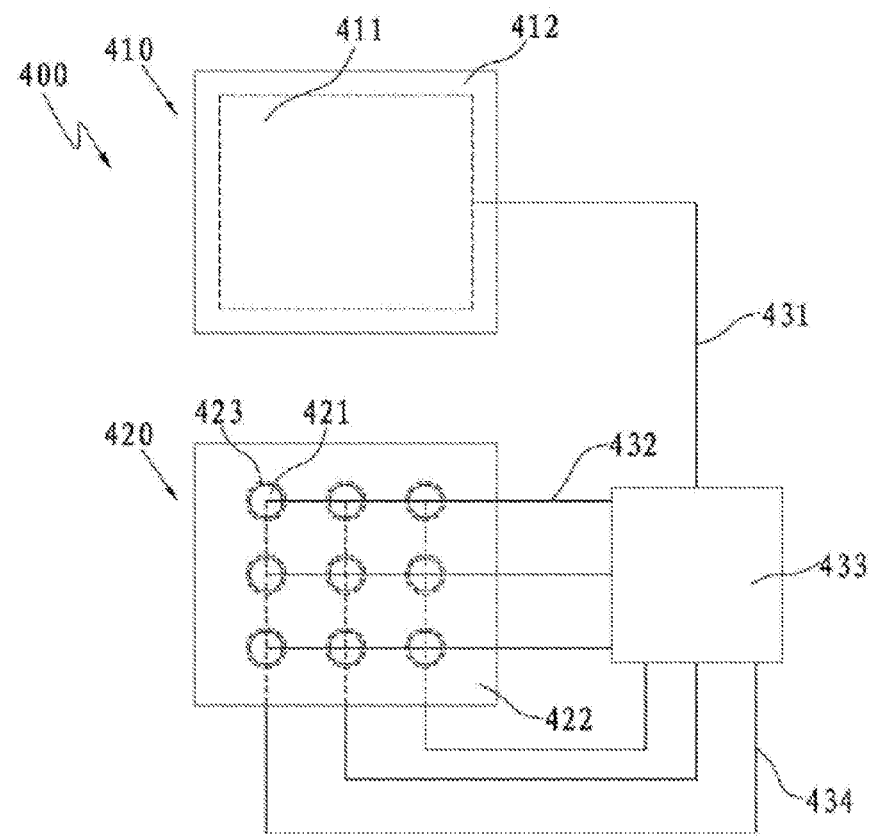

FIG. 7a and FIG. 7b show the fourth embodiment of the present invention, an inductive touch sensor 400, following the another driving-detecting principle described immediately above in paragraph [0033]. The inductive touch sensor 400 comprises a driving layer 410 having a driving electrode 411, an induced layer 420 having a plurality of induced electrodes, and an inductive circuit 430. The driving electrode 411 is a conductive plate and placed on the inner surface of a driving substrate 412 for getting support. The induced electrodes are divided into a plurality of first induced electrodes 421 laying on the inner surface of an induced substrate 422 and a plurality of second induced electrodes 423 laying on the outer surface of the induced substrate 422. The inductive circuit 430 includes a controller 433, a driving conductor line 431, a plurality of first induced conductor lines 432, and a plurality of second induced conductor lines 434. The driving conductor line 431 connects the driving electrode 411 to the controller 433 for providing a driving current. The first induced conductor lines 432 connect the first induced electrodes 421 to the controller 433 in the first direction on the inner surface of the induced substrate 422, and the second induced conductor lines 434 connect the second induced electrodes 423 to the controller 433 in the second direction on the outer surface of the induced substrate 422.

When the driving current is applied to the driving electrode 411 through the driving conductor line 431, the space between the first induced electrode 421 and the driving electrodes 411 is filled with the magnetic field caused by the driving current. In the first induced electrodes 421 and the second induced electrodes 423, the inductances are introduced. If a touch occurs on a location of the outer surface of the driving substrate 412, the distance between the driving electrode 411 and the first induced electrodes 421 will decrease at the touch location. This decrease leads to the increase in inductance in the first induced electrodes 421, and an induced electrical signal representing the increase in inductance is sent to the controller 433 through the first induced conductor lines 431. Based on the induced electrical signal in the first induced electrodes 421, the controller 433 will compute the touch location in the first direction. At the meantime that the driving electrode 411 moves closer to the first induced electrodes 421, the distance between the driving electrode 411 and the second induced electrodes 423 located on the outer surface of the induced substrate 422 also decrease. Thus, in the same way, we could get the touch location in the second direction. Similar to the first embodiment, the touch location could be determined by the controller 433 based on both the first induced conductor lines 432 in the first direction and the second induced conductor lines 434 in the second direction.

Figure 8:
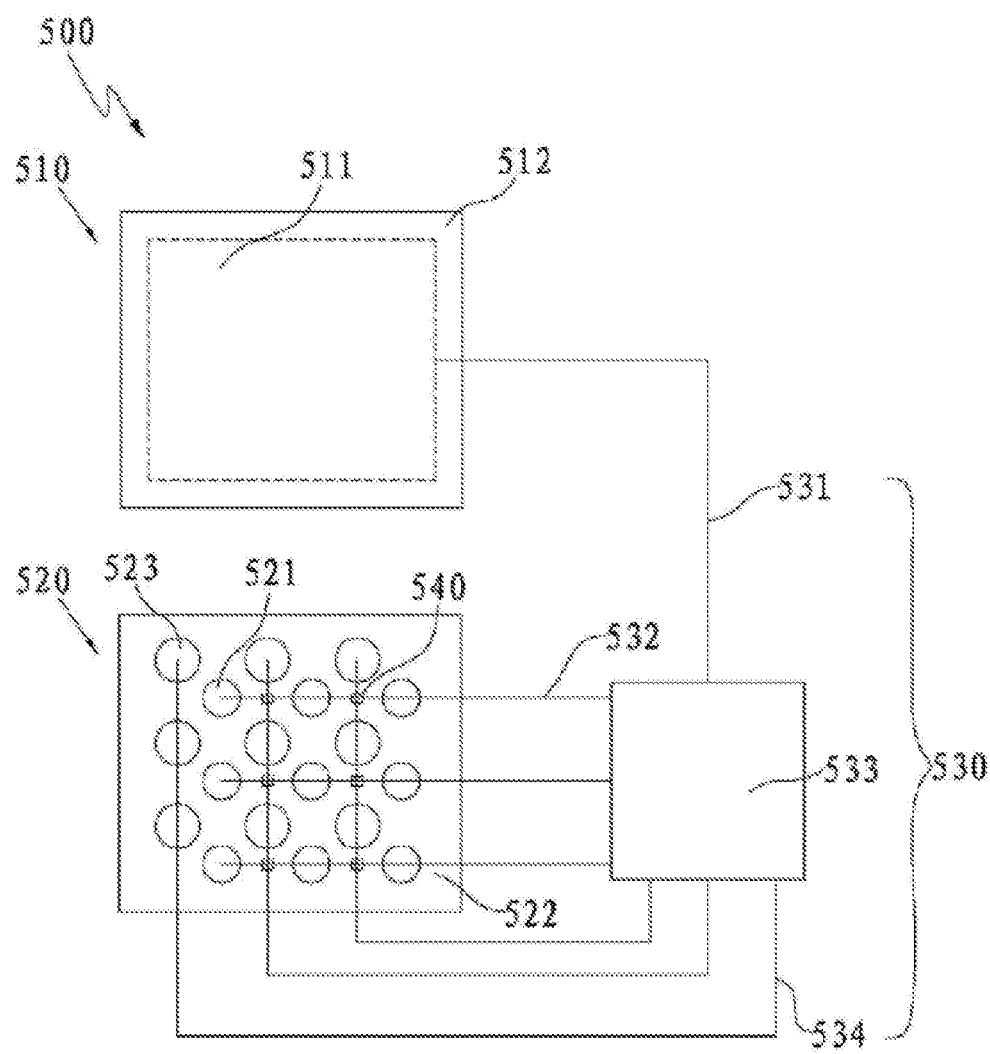
FIG. 8 is a schematic exploded plan view of an inductive touch sensor in accordance with the fifth embodiment of the present invention

There is a further object to provide an inductive touch sensor 500 in accordance with the fifth embodiment, wherein the induced electrodes could be disposed on the same surface of the induced substrate, as shown in FIG. 8. The inductive touch sensor 500, similar to the fourth embodiment, comprises a driving layer 510 having a driving electrode 511, an induced layer 520 having a plurality of first induced electrodes 521 and a plurality of second induced electrodes 523, and an inductive circuit 530. The driving layer 510 faces to the induced layer 520. The driving electrode 511 is a conductive plate and placed on the inner surface of a driving substrate 512 for getting support. Both the first induced electrodes 521 and the second induced electrodes 523 are placed on the inner surface of the induced substrate 522. The inductive circuit 530 includes a controller 533, a driving conductor line 531, a plurality of first induced conductor lines 532, and a plurality of second induced conductor lines 534. The first induced conductor lines 532 connect the first induced electrodes 521 in the first direction on the induced substrate 522 to the controller 533, and the second induced conductor lines 534 connect the second induced electrodes 523 in the second direction on the induced substrate 522 to the controller 533. The controller 533 is connected to the driving electrode 511 via the driving conductor line 531 to provide the driving current.

The first induced conductor lines 532 and the second induced conductor lines 534 intersect with each other. At the intersections, a plurality of insulator pieces 540 are positioned between the first induced conductor lines 532 and the second induced conductor lines 534 to make them insulated from each other. The method for detecting the touch location is the same as that of the fourth embodiment. The induced electrical signal representing the change in inductance is output to the controller 533 through both the first induced conductor lines 532 in the first direction and the second induced conductor lines 534 in the second direction. As a result, the touch location is determined by the controller 533 in both the first direction and the second direction. Besides, the touch could present on either the outer surface of the driving substrate 512 or the outer surface of the induced substrate 522.

Figure 9A:
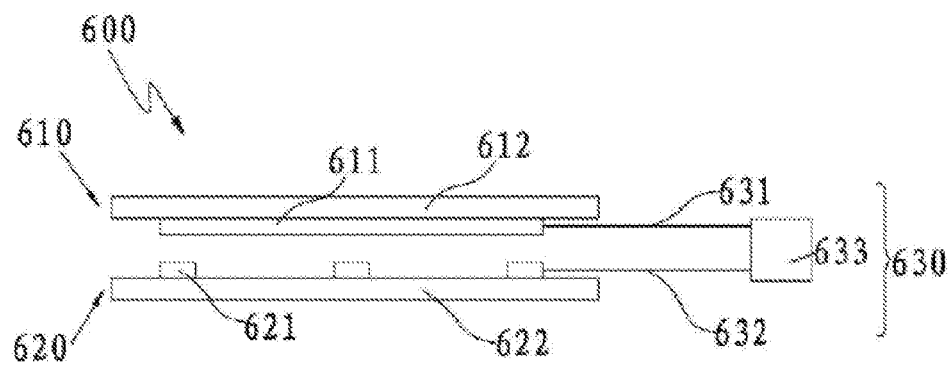
FIG. 9a is a schematic sectional view of an inductive touch sensor in accordance with the sixth embodiment of the present invention.
Figure 9B:
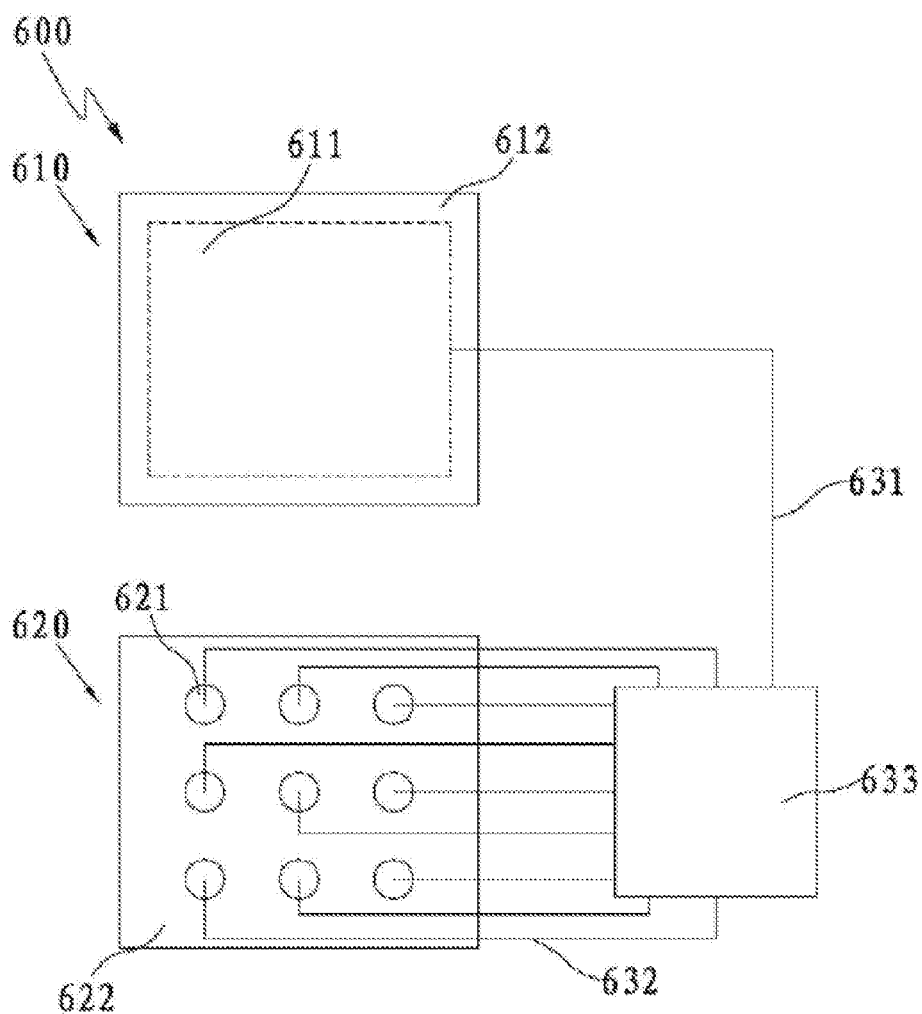

The touch location is determined by the controller in the electrodes arranged in two different directions, shown as above embodiments. If each induced electrode can indicate a unique location independently, the touch location will be found out by every induced electrode. FIG. 9a and FIG. 9b show an inductive touch sensor 600 in accordance with the sixth embodiment of the present invention. The inductive touch sensor 600 includes a driving layer 610 having a driving electrode 611, an induced layer 620 having a plurality of induced electrodes 621, and an inductive circuit 630. The driving layer 610 faces to the induced layer 620. The driving electrode 611 lays on the inner surface of a driving substrate 612, while the induced electrodes 621 lay on the inner surface of an induced substrate 622. The inductive circuit 630 contains a controller 633, a driving conductor line 631, and a plurality of induced conductor lines 632. Each induced electrode 621 is connected to the controller 633 respectively through each induced conductor line 632, and the driving electrode 611 is connected to the controller 633 through the driving conductor line 631.

Similar to the above embodiments, the magnetic field generated in the driving electrode 611 induces the inductance in the induced electrodes 621. Induced electrical signals representing the changes in inductances in some induced electrodes 621, corresponding to the touch occurred on the outer surface of the driving substrate 612, will be sent to the controller 633 to determine the touch location. Because each induced electrode 621 is connected to controller 633 respectively, the location of individual induced electrode 621 indicates the touch location directly. As a result, the touch location is determined by the individual induced electrode 621 where the change, in inductance creates. In use, the touch could present on either the outer surface of the driving substrate 612 or the outer surface of the induced substrate 622.

In the present invention, the driving layer and the induced layer could be spaced by insulating medium 140. Moreover, the driving electrodes may be placed on either the outer surface or the inner surface of the driving substrate, and on both the outer surface and the inner surface of the driving substrate as well. Similarly, the induced electrodes may be placed on either outer surface or the inner surface of the induced substrate, and on both outer surface and inner surface as well. Given the driving electrodes located on the outer surface of the driving substrate or the induced electrodes located on the outer surface of the induced substrate, one or more cover sheets (not shown) could be introduced to lay on the driving electrodes or the induced electrodes to protect them from being scratched.

According to various use environments, the outer surface of the induced layer in the above mentioned embodiments of the present invention could be provided for touching, resulting in that the induced electrodes moves to the driving electrodes closer.

Applied in various touch devices, the inductive touch sensor may be opaque or transparent, e.g. the touch pad of the laptop computer and the touch screen of the cell phone. In virtue of the inductive sensing method, the touch sensor can detect both conductive and dielectric objects touches with distinguished sensitivity in various environments.

There should be at least one of the driving electrodes and at least one of the induced electrodes in the present invention. The resolution and the size of the inductive touch sensor is the main factor influencing the amount of electrodes. Normally, the higher resolution or the larger size it is required, the more electrodes are needed. The amount of the driving conductor lines and the induced conductor lines is determined by the amount of the driving electrodes and the induced electrodes. Besides, the amount of the inductive circuit is affected by the requirement of industrial design.

Although the present invention has been described with reference to the embodiments thereof and the best modes for carrying out the present invention, it is apparent to those skilled in the art that a variety of modifications and changes may be made without departing from the scope of the present invention. Accordingly, it is to be understood that the present invention has been described by way of illustration and not limitations.

What is claimed is:

1. An inductive touch sensor, comprising:
    a driving layer to generate a magnetic field, wherein said driving layer comprises a plurality of driving electrodes, said driving electrodes are located on a plurality of driving lines;
    an induced layer spaced apart from said driving layer, wherein said induced layer comprises a plurality of induced electrodes, said induced electrodes are located on a plurality of induced lines, and said magnetic field induces an induction on said induced layer, wherein when one of said driving layer and said induced layer is depressed, at least one change in said induction occurs; and
    at least one inductive circuit connected to said driving layer and said induced layer;
    wherein a driving current is applied to said driving layer by a controller, therefore generating said magnetic field which induces a current in said induced layer and when the distance between said driving layer and said induced layer changed as a result of a user's touch, and said controller is capable of detecting the change in current in said induced layer to determine a touch location in two dimensional space.

2. The inductive touch sensor of claim 1, wherein said induced electrodes are connected to said at least one inductive circuit.

3. The inductive touch sensor of claim 2, wherein said induced layer further comprises an induced substrate with said induced electrodes placed on an inner surface of said induced substrate.

4. The inductive touch sensor as claimed in claim 2, wherein said induced layer further comprises an induced substrate with said induced electrodes placed on an outer surface of said induced substrate.

5. The inductive touch sensor of claim 2, wherein said driving electrodes are connected to said at least one inductive circuit.

6. The inductive touch sensor of claim 5, wherein said driving layer further comprises a driving substrate with said driving electrodes placed on an inner surface of said driving substrate.

7. The inductive touch sensor of claim 5, wherein said driving layer further comprises a driving substrate with said driving electrodes placed on an outer surface of said driving substrate.

8. The inductive touch sensor of claim 5, wherein said inductive circuit comprises:
    said controller;
    a plurality of driving conductor lines connecting said driving lines, wherein said driving electrodes connect to said controller through said driving conductor lines and said driving lines; and
    a plurality of induced conductor lines connecting said induced lines, wherein said induced electrodes connect to said controller through said induced conductor lines and said induced lines.

9. The inductive touch sensor of claim 8, wherein said at least one driving conductor line extends along at least one direction from a point and said induced conductor lines distribute as concentric circles whose centre is a point on said induced layer.

10. The inductive touch sensor of claim 9, wherein said at least one driving conductor line further comprises at least two driving conductor lines extending along different directions from said point.

11. The inductive touch sensor of claim 10, wherein said driving layer further comprises a plurality of insulator pieces located at the intersection of said at least two driving conductor lines to insulate said driving conductor lines from each other.

12. The inductive touch sensor of claim 9, wherein said induced conductor lines comprises concentric arcs.

13. The inductive touch sensor of claim 8, wherein said at least one driving conductor line further comprises at least two driving conductor lines distributing as at least two concentric circles whose centre is a point and said induced conductor lines extend along different directions from a point on said induced layer.

14. The inductive touch sensor of claim 13, wherein said at least two driving conductor lines comprises concentric arcs.

15. The inductive touch sensor of claim 13, wherein said induced layer further comprises a plurality of insulator pieces located at the intersection of said induced conductor lines to insulate said induced conductor lines from each other.

16. The inductive touch sensor of claim 8, wherein said induced conductor lines connect each said induced electrode to said controller respectively.

17. The inductive touch sensor of claim 8, wherein said induced electrodes comprise a plurality of first induced electrodes and a plurality of second induced electrodes.

18. The inductive touch, sensor of claim 17, wherein said induced conductor lines comprise a plurality of first induced conductor lines connecting said first induced electrodes to said controller in a first direction and a plurality of second induced conductor lines connecting said second induced electrodes to said controller in a second direction different to said first direction.

19. The inductive touch sensor of claim 18, wherein said first induced electrodes are placed on an inner surface of said induced substrate and said second induced electrodes are placed on an outer surface of said induced substrate.

20. The inductive touch sensor of claim 18, wherein said inductive layer further comprises a plurality of insulator pieces located between said first induced conductor lines and said second induced conductor lines at the intersection of said first induced conductor lines and said second induced conductor lines.

21. The inductive touch sensor of claim 1, wherein said driving lines are disposed in a first direction and said induced lines are disposed in a second direction different to said first direction, and each of said driving electrodes is located on a corresponding intersection of said driving line and said induced line, and said induced electrodes align to said driving electrodes.

22. The inductive touch sensor of claim 1, wherein said driving layer and said induced layer are spaced by insulating medium.

23. The inductive touch sensor of claim 22, wherein said insulating medium is made of deformable material.

24. A detecting method of detecting at least one touch location on an inductive touch sensor, comprising steps of:

applying a driving current to a driving layer to generate a magnetic field which induces an inductance on an induced layer, wherein said driving layer comprises a plurality of driving electrodes located on a plurality of driving lines, wherein said driving current is applied to one driving line at a time; and wherein said induced layer comprises a plurality of induced electrodes located on a plurality of induced lines; and wherein said plurality of induced lines are sensed in sequence by a controller circuit when said driving current is applied to said driving lines such a way that one driving line is driven at any time by applying said driving current to said driving line, while all said sensing lines are sensed sequentially when one driving line is driven by said driving current;

identifying at least one change in said inductance when the distance between said driving lines and said induced lines change as a result of a user's touch; and determining said at least one touch location in two dimensional space by processing said at least one change in said inductance.

25. The detecting method of claim 24, further comprising a step of providing at least one inductive circuit, wherein said inductive circuit comprises a controller, a plurality of driving conductor lines connecting said driving lines to said controller and a plurality of induced conductor lines connecting said induced lines to said controller.

26. The detecting method of claim 25, wherein said driving current is applied to said driving lines by said driving conductor lines in turn in the step of applying a driving current.

27. The detecting method of claim 26, wherein said induced layer comprises an induced substrate and said induced electrodes and said induced lines are placed on said induced substrate, and wherein said driving layer comprises a driving substrate and said driving electrodes and said driving lines are placed on said driving substrate.

28. The detecting method of claim 24, wherein said inductive touch sensor further comprises a plurality of first induced conductor lines and a plurality of second induced conductor lines connecting said induced layer to said controller.

29. The detecting method of claim 28, wherein determining said at least one touch location is based on both said first induced conductor lines and said second induced conductor lines.

30. The detecting method of claim 24, wherein an outer surface of said driving layer is depressed in the step of identifying at least one change in said inductance.

31. The detecting method of claim 24, wherein said change in said inductance is reflected in change in distance between said driving layer and said induced layer when one of said driving layer and said induced layer is depressed.

32. The detecting method of claim 24, wherein in the step of identifying at least one change in said inductance, one of said driving layer and said induced layer is depressed by a conductive object or an dielectric object.

* * * * *